US008888966B2

United States Patent
Nagata

(10) Patent No.: US 8,888,966 B2
(45) Date of Patent: Nov. 18, 2014

(54) PROTECTIVE FILM MAINLY COMPOSED OF A TETRAHEDRAL AMORPHOUS CARBON FILM AND A MAGNETIC RECORDING MEDIUM HAVING THE PROTECTIVE FILM

(75) Inventor: Naruhisa Nagata, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 13/323,429

(22) Filed: Dec. 12, 2011

(65) Prior Publication Data

US 2012/0082803 A1 Apr. 5, 2012

Related U.S. Application Data

(62) Division of application No. 12/471,349, filed on May 22, 2009, now abandoned.

(30) Foreign Application Priority Data

May 26, 2008 (JP) .................................. 2008-136788

(51) Int. Cl.
*C23C 14/00* (2006.01)
*C23C 14/32* (2006.01)
*G11B 5/84* (2006.01)
*G11B 5/72* (2006.01)

(52) U.S. Cl.
CPC .................. *G11B 5/8408* (2013.01); *G11B 5/72* (2013.01)
USPC ..................... 204/192.38; 427/580

(58) Field of Classification Search
CPC .......................... C23C 14/0605; C23C 14/325
USPC ....................... 204/192.38; 427/580
See application file for complete search history.

(56) References Cited

U.S. PATENT DOCUMENTS 4,668,496 A * 5/1987 Korb et al. ................ 423/445 R
5,401,543 A 3/1995 O'Neill et al.

(Continued)

FOREIGN PATENT DOCUMENTS

JP 07-070746 A 3/1995
JP 2002-334428 A 11/2002

(Continued)

OTHER PUBLICATIONS

Harris, P. J. F. "Fullerene-related structure of commercial glassy carbons." Philosophical magazine 84.29 (Oct. 2004): 3159-3167.*

(Continued)

*Primary Examiner* — Keith Hendricks
*Assistant Examiner* — Ibrahime A Abraham
(74) *Attorney, Agent, or Firm* — Rossi, Kimms & McDowell LLP

(57) ABSTRACT

A protective film is disclosed that is mainly composed of a tetrahedral amorphous carbon (ta-C film) that is denser than a DLC film formed by a plasma CVD method and containing aggregate particles so reduced as to a necessary and sufficient level, to provide a method of manufacturing such a protective film, and to provide a magnetic recording medium comprising such a protective film. The film is mainly composed of a ta-C film formed by a filtered cathodic arc method using a cathode target of glass state carbon. A magnetic recording medium is disclosed which includes a substrate, a magnetic recording layer, and the protective film mainly composed of a ta-C film.

5 Claims, 2 Drawing Sheets

(56) References Cited

U.S. PATENT DOCUMENTS

| | | | |
|---|---|---|---|
| 2003/0148102 A1* | 8/2003 | Hyodo | 428/408 |
| 2006/0029806 A1* | 2/2006 | Hyodo et al. | 428/408 |

FOREIGN PATENT DOCUMENTS

| | | |
|---|---|---|
| JP | 2004-054991 A | 2/2004 |
| JP | 2004-244667 A | 9/2004 |
| JP | 2004-256837 A | 9/2004 |

OTHER PUBLICATIONS

Kuhnke, Markus, et al. "Micromachining of Carbon Materials and Laser Micropatterning of Metal Films used as Masks for Reactive Ion Etching." JLMN—Journal of Laser Micro/Nanoengineering 1.1 (2006).*

Japanese Office Action, Notification of Reasons for Refusal, in corresponding JP2008-136788, dated Sep. 22, 2011.

* cited by examiner

PROTECTIVE FILM MAINLY COMPOSED OF A TETRAHEDRAL AMORPHOUS CARBON FILM AND A MAGNETIC RECORDING MEDIUM HAVING THE PROTECTIVE FILM

CROSS REFERENCE TO RELATED APPLICATION

This application is a divisional application of U.S. patent application Ser. No. 12/471,349 filed on May 22, 2009 which is based on and claims priority from JP2008-136788 filed on May 26, 2008 the contents of which is incorporated herein in its entirety by reference.

BACKGROUND OF THE INVENTION

A. Field of the Invention

The present invention relates to a protective film of a magnetic recording medium.

B. Description of the Related Art

Existing magnetic recording media have a protective film composed of a diamond-like carbon (DLC) film deposited on a magnetic recording layer by means of a plasma CVD method in order to protect the magnetic recording layer against damage resulting from contact with and sliding of a magnetic head and corrosion of the magnetic recording layer. The DLC film exhibits such a good surface smoothness and large hardness as to be suited for a coating film. The DLC films are formed by means of a sputtering method and a plasma CVD method.

Magnetic recording media are now changing from the longitudinal recording system to the perpendicular recording system, the latter being capable of higher recording density than the former. For enhanced recording density of a magnetic recording medium, the perpendicular magnetic recording system, like the longitudinal recording system, needs to have a reduced distance (a magnetic spacing) between the magnetic recording layer and the magnetic head. A thickness of a protective film formed on the magnetic recording layer accounts for a portion of the magnetic spacing. It is therefore necessary to reduce the thickness of the protective film to be as thin as possible to enhance the recording density while ensuring the function of a protective film.

To ensure the protective function of such a thinned film, the protective film must be as dense as possible. A DLC film formed by a plasma CVD method is denser than a DLC film formed by a sputtering method. A filtered cathodic arc (FCA) method is one of the methods capable of forming a further dense carbon film.

The FCA method uses a cathode target of polycrystalline graphite, which is vaporized and ionized by arc discharge. A magnetic filter sorts out only carbon ions, which are then transported to a target substrate for film deposition. Since the carbon film is formed on the target substrate only with carbon ions, the FCA method can form a tetrahedral amorphous carbon (ta-C) film which does not contain hydrogen. The resulting ta-C film is denser than a DLC film.

Using this ta-C film in a magnetic recording medium, a protective film is expected to be accomplished that is thinner than a protective film composed of a DLC film formed by a plasma CVD method. The ta-C film formed by the FCA method, however, has a problem in that it contains a large amount of aggregate particles.

In order to reduce the aggregate particles, Japanese Unexamined Patent Application Publication No. 2004-244667 discloses a means for capturing the particles which employs a shielding structure called a baffle in the above-mentioned magnetic filter.

To reduce further the aggregate particles formed in the FCA method, Japanese Unexamined Patent Application Publication No. 2004-256837 discloses a structure comprising a plasma forming part between a magnetic filter and a film deposition chamber, the plasma forming part transforming the carbon aggregate particles passing through the magnetic filter into carbon ions.

Japanese Unexamined Patent Application Publication No. 2002-334428 discloses a method for generating carbon ions by irradiating a solid-state carbon source composed of graphite with KrF excimer laser light in place of an arc discharge in the FCA method.

Moreover, the flying height of the magnetic head, which accounts for a part of the magnetic spacing as well as the protective film thickness, decreases each year in order to enhance the recording density. Thus, the reduction of aggregate particles in the protective film has been required to be more rigorous each year. Conventional technologies cannot fully meet this rigorous requirement for reduction of the aggregate particles.

The present invention is directed to overcoming or at least reducing the effects of one or more of the problems set forth above.

SUMMARY OF THE INVENTION

The present invention provides a protective film mainly composed of a ta-C film that is denser than a DLC film formed by a plasma CVD method and that contains aggregate particles in an amount that is reduced to the requisite and sufficient level. The invention provides a method of manufacturing such a protective film. The invention also provides a magnetic recording medium comprising such a protective film.

A protective film for a magnetic recording medium, the protective film being a first aspect of the invention, is mainly composed of a tetrahedral amorphous carbon film formed by a filtered cathodic arc method using a cathode target of glass state carbon. The protective film preferably has a thickness not greater than 3 nm.

A method of manufacturing a protective film for a magnetic recording medium, the method being a second aspect of the invention, comprises a step of generating a plasma that contains carbon ions by arc discharge between an anode and a cathode target composed of glass state carbon, a step of transporting only the carbon ions through a filter part to a film deposition chamber, and a step of forming a protective film mainly composed of tetrahedral amorphous carbon film by depositing the carbon ions on a target substrate for film deposition disposed in the film deposition chamber.

A magnetic recording medium, which is the third aspect of the invention, comprises at least a substrate, a magnetic recording layer, and a protective film formed on the magnetic recording layer, wherein the protective film is the protective film for a magnetic recording medium mainly composed of a tetrahedral amorphous carbon according to the first aspect of the invention.

Taking the above described construction and using a cathode target of glass state carbon in an FCA method, a ta-C film has been obtained that is denser than a DLC film formed by a plasma CVD method and that contains aggregate particles so reduced as to be at a necessary and sufficient level. The resulting ta-C film is useful for a protective film of a magnetic recording medium. A magnetic recording medium using such a ta-C film of the invention for a protective film allows a low flying height of a magnetic head owing to a reduced amount of aggregate particles. Therefore, high density recording is possible through reduction of the magnetic spacing.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Figure 1:
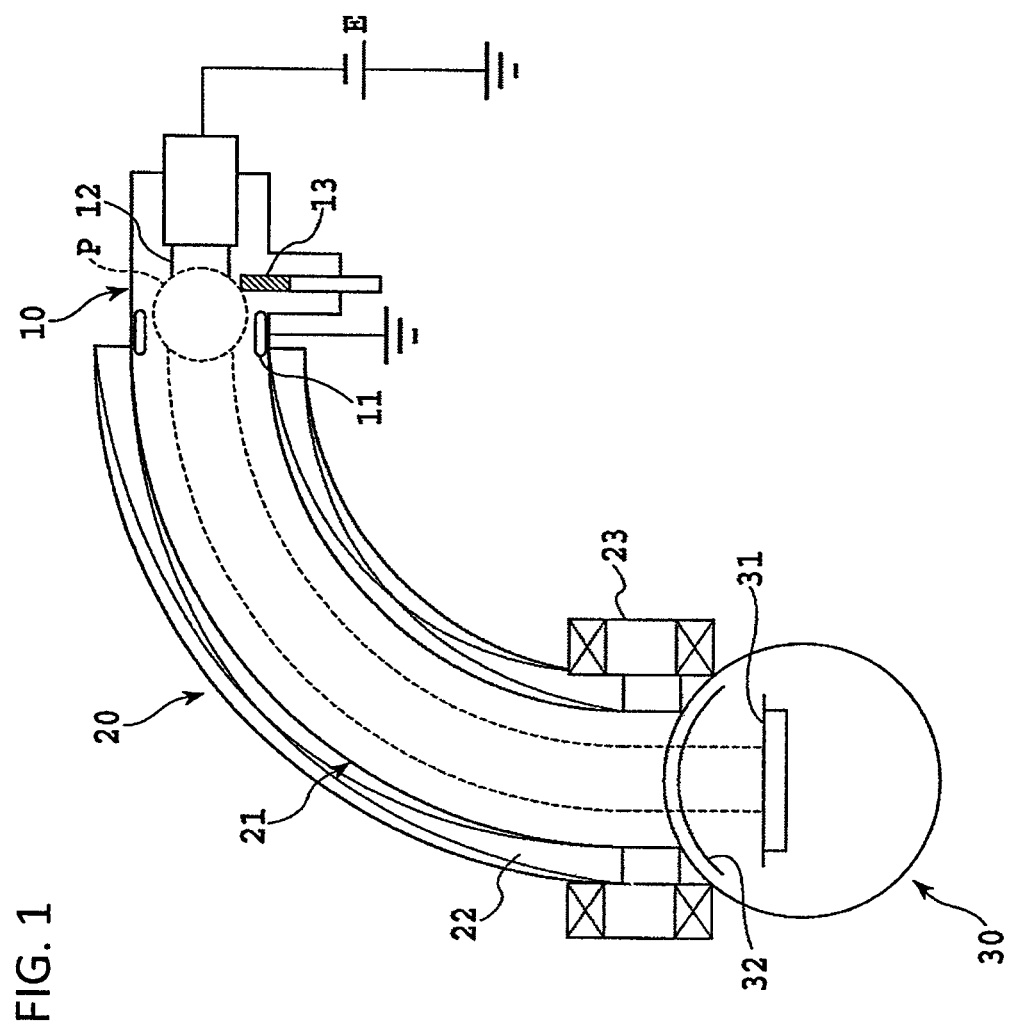
FIG. 1 shows an example of FCA device used in manufacturing a ta-C film according to the invention.

FIG. 1 shows an example of FCA device used in manufacturing a ta-C film according to the invention. The FCA device includes arc source 10, film deposition chamber 30, and filter part 20 that connects arc source 10 and film deposition chamber 30. Arc source 10 includes anode 11, cathode target 12, and striker electrode 13. Filter part 20 includes core pipe 21, filter coil 22 disposed around core pipe 21, and raster coil 23 disposed adjacent to film deposition chamber 30. The film deposition chamber 30 accommodates target substrate for film deposition 31 and includes shutter 32 for blocking particles introduced from filter part 20.

The following describes an FCA method for forming a ta-C film according to the invention. First, in arc source 10, a voltage is applied between anode 11 and cathode target 12 and in this state, striker electrode 13 contacts cathode target 12 to generate an electric current flow between cathode target 12 and striker electrode 13, starting arc discharge between anode 11 and cathode target 12. A pressure in the FCA device including arc source 10 is set at a value not greater than 0.01 Pa. The voltage applied between anode 11 and cathode target 12 is ordinary in the range of 30 to 50 V. FIG. 1 shows an example of construction with anode 11 at a ground state and cathode target 12 at a negative voltage applied from a power supply E, while other constructions are possible. An electric current supplied between cathode target 12 and striker electrode 13 for initiating the arc discharge is normally in the range not greater than 120 A. After an arc discharge begins, striker electrode 13 is separated from cathode target 12.

In order to avoid overheating during the arc discharge, a cooling means (not shown in the figure) may be provided in each of anode 11 and cathode target 12. A means for generating a magnetic field (for example, an electromagnet; not shown in the figure) may be provided for maintaining charged particles (electrons) within arc source 10 to continue the arc discharge.

The arc discharge evaporates the carbon in the glass state used for cathode target 12 and ionizes the carbon in a gaseous state with electrons in the discharge, establishing plasma P including carbon atoms, carbon ions and electrons. The wording "glass state carbon" in this invention means an isotropic carbon substance having a structure in which fine hexagonal mesh structures of graphite are randomly combined by a $sp^3$-like bonding. The glass state carbon can be produced by carbonize and graphitize a thermosetting resin such as a phenol resin through a high temperature heat treatment under an inert gas atmosphere. Glass state carbon having various properties is commercially available from raw material manufacturers. The graphite that has been conventionally used in the cathode target in the FCA method has a polycrystalline structure containing crystal grains and grain boundaries. Aggregate particles are liable to be generated by detachment from the cathode target, caused by the existence of grain boundaries, of a large amount of aggregate particles (carbon particles) having a diameter in the range of several nm to several tens of nm. In contrast, the glass state carbon used in the present invention is intrinsically in a glass state and contains no grain boundary. Owing to this structural difference, generation of detrimental aggregate particles is inhibited by utilizing the glass state carbon.

The carbon ions generated in arc source 10 by the arc discharge are transported to filter part 20 with the kinetic energy obtained upon release from cathode target 12, the pressure difference between arc source 10 and filter part 20, and the Coulomb force. A grid electrode (not shown) may be provided at the connection part of arc source 10 and filter part 20 to assist transporting the carbon ions towards filter part 20.

Then, only carbon ions out of the particles introduced from arc source 10 are transported by filter part 20 to film deposition chamber 30. The example of core pipe 21 of filter part 20 shown in FIG. 1 has a configuration of a quarter arc, but core pipe 21 may have any other configuration known in the art.

In the case that uses core pipe 21 with a quarter arc configuration as shown in FIG. 1 and filter coil 22 arranged around the core pipe, filter coil 22 desirably generates a magnetic field at a magnetic flux density of about 0.013 T in core pipe 21. The magnetic field having the flux density indicated above can be generated by supplying filter coil 22 with normally an electric current of about 10 A, though depending on the structure of filter part 20. With this magnetic field, only the desired carbon ions run along the quarter arc in core pipe 21 and are introduced to film deposition chamber 30. Neutral particles and aggregate particles other than the carbon ions strike the inner wall of core pipe 21 and cannot arrive at film deposition chamber 30. A baffle (not shown) may be provided at the inner wall of core pipe 21 in order to trap neutral particles and aggregate particles other than the desired carbon ions.

Raster coil 23 disposed at the end of core pipe 21 and adjacent to the introductory location of film deposition chamber 30 modifies the direction of flight of the carbon ions and is advantageous for forming a carbon coating film with a uniform thickness over the whole surface of target substrate for film deposition 31. For example, two types of raster coils 23 generating magnetic fields in the two orthogonal directions (X and Y directions) are arranged, scanning the carbon ions with the magnetic fields and controlling the positions on target substrate for film deposition 31 at which the carbon ions strike the substrate surface.

Finally, the carbon ions introduced into film deposition chamber 30 by filter part 20 strike target substrate for film deposition 31 to form a ta-C film. Film deposition chamber 30 may be provided with shutter 32 for blocking the carbon ions that are passed by filter part 20. Target substrate for film deposition 31 may be supplied with a bias voltage to promote formation of the ta-C film, as necessary. A film thickness of the ta-C film formed on the target substrate for film deposition can be controlled by a deposition time.

A protective film for a magnetic recording medium can be provided by depositing a ta-C film on the surface of the magnetic recording medium through the process described above. The wording "mainly composed of a ta-C film" means that layers having auxiliary functions may be provided in the protective film in addition to the ta-C film.

A magnetic recording medium according to the invention will be described in detail in the following. A magnetic recording medium of the invention comprises at least a substrate, a magnetic recording layer, and a protective film composed of ta-C film formed on the magnetic recording layer. A magnetic recording medium can include, as required, a nonmagnetic underlayer, a soft magnetic layer, a seed layer and/or an intermediate layer between the substrate and the magnetic recording layer. A magnetic recording medium can further have a liquid lubricant layer on the protective film, if necessary. A magnetic recording medium of the invention can be manufactured by depositing a ta-C film employing the FCA method on the laminated layers of the magnetic recording layer and the layers formed thereunder to form a protective film. After forming the protective film, a liquid lubricant layer can be further provided.

The substrate is preferably nonmagnetic, and can be composed of any material that has been used for manufacturing magnetic recording media. Useful materials for the substrate include Ni—P-plated aluminum alloy, glass, ceramics, and plastics.

A nonmagnetic underlayer is optionally provided and can be formed of nonmagnetic materials including titanium and chromium-containing alloy such as CrTi.

A soft magnetic layer is optionally provided and can be formed of a crystalline material such as FeTaC or sendust alloy (FeSiAl), a microcrystalline material such as FeTaC, CoFeNi, or CoNiP, or an amorphous material including a cobalt alloy such as CoZrNd, CoZrNb, or CoTaZr. The soft magnetic layer functions to concentrate a vertical magnetic field generated by a magnetic head in the magnetic recording layer in a perpendicular magnetic recording medium. A thickness of the soft magnetic layer is preferably in the range from 10 nm to 500 nm in view of compatibility with productivity, while the optimum value varies with a structure and characteristics of a magnetic head used for recording.

A seed layer is optionally provided and can be formed of: a permalloy material such as NiFeAl, NiFeSi, NiFeNb, NiFeB, NiFeNbB, NiFeMo, or NiFeCr; a cobalt-containing permalloy material such as CoNiFe, CoNiFeSi, CoNiFeB, or CoNiFeNb; cobalt; or a cobalt-based alloy such as CoB, CoSi, CoNi, or CoFe. The seed layer is desired to have a thickness sufficient for controlling a crystal structure of the magnetic recording layer and a preferable thickness is normally in the range of 3 nm to 50 nm.

An intermediate layer can be optionally provided and formed of ruthenium or an alloy mainly composed of ruthenium. The intermediate layer normally has a thickness in the range of 0.1 nm to 20 nm. A thickness in this range can give the properties necessary for high density recording to the magnetic recording layer without degrading magnetic performance or electromagnetic conversion performance of the magnetic recording layer.

The magnetic recording layer can be favorably formed of a ferromagnetic alloy containing at least cobalt and platinum. An axis of easy magnetization of the ferromagnetic material needs to be aligned in the direction of magnetic recording. For perpendicular magnetic recording, for example, the axis of easy magnetization of the magnetic recording layer material (the c-axis of the hexagonal closest packing (hcp) structure) needs to be aligned in the direction perpendicular to the surface of the magnetic recording medium (a principal plane of the substrate). The magnetic recording layer can be formed of an alloy material such as CoPt, CoCrPt, CoCrPtB, or CoCrPtTa. A thickness of the magnetic recording layer is not limited to special values, but in view of productivity and enhancement of recording density, the magnetic recording layer preferably has a thickness not larger than 30 nm, more preferably not larger than 15 nm.

The nonmagnetic underlayer, the soft magnetic layer, the seed layer, the intermediate layer and the magnetic recording layer can be formed by means of any method selected from known techniques in the art, including sputtering methods such as DC magnetron sputtering and RF magnetron sputtering, vacuum evaporation, and the like.

A liquid lubricant layer is optionally provided to provide lubricity during contact between the magnetic recording medium and the magnetic head for read/write. The liquid lubricant layer can be formed of a liquid lubricant of perfluoropolyether or various liquid lubricant materials known in the art by any application technique known in the art such as dip coating or spin coating.

A ta-C film formed as a protective film on the surface of a magnetic recording medium in particular, has a film thickness preferably not larger than 3.0 nm. A thickness in this range can control the density of aggregate particles present on the protective film to be less than $30/cm^2$. Since a ta-C film obtained by the present invention is denser than a DCL film formed by the plasma CVD method, a thin film in this range yet exhibits a satisfactory protective effect. Reduction in flying height of the magnetic head owing to reduction in the density of aggregate particles, along with the decrease in film thickness, allows reduction in a magnetic spacing. Therefore, a magnetic recording medium capable of high recording density is obtained.

Example 1

First, on an aluminum substrate with a diameter of 95 mm and a thickness of 1.75 mm sequentially deposited were: an underlayer 20 nm thick of CoZrNb, an intermediate layer 15 nm thick of ruthenium, and a magnetic recording layer 15 nm thick of CoCrPt—$SiO_2$, to fabricate a semi manufactured magnetic recording medium. The resulting semi-manufactured magnetic recording medium was installed as a target substrate for film deposition in a film deposition chamber of an FCA device.

A voltage of 30 V was applied between an anode and a cathode target composed of glass state carbon (Glassy Carbon, a product of Tokai Carbon Co, Ltd.) and a striker electrode contacted the cathode target to run an electric current of 120 A and to initiate an arc discharge. Adjusting the deposition time, a protective film was formed depositing a ta-C film 3.0 nm thick on the magnetic recording layer. Thus, a magnetic recording medium was obtained.

Examples 2 and 3

Magnetic recording media of Examples 2 and 3 were obtained repeating the same procedure as in Example 1 except that the ta-C films deposited had thicknesses of 2.5 nm in Example 2 and 2.0 nm in Example 3, by correspondingly varying the deposition time.

Comparative Examples 1 and 2

Magnetic recording media of Comparative Examples 1 and 2 were obtained repeating the same procedure as in Example 1 except that the ta-C films were deposited to thicknesses of 3.5 nm in Comparative Example 1 and 4.0 nm in Comparative Example 2 by correspondingly varying the deposition time.

Comparative Example 3

Magnetic recording media of Comparative Example 3 were obtained repeating the same procedure as in Example 1 except that the cathode target used was composed of polycrystalline graphite. The protective films were formed of ta-C films having thicknesses of 2.0, 2.5, 3.0, 3.5, and 4.0 nm by correspondingly varying the deposition time.

Evaluation

Figure 2:
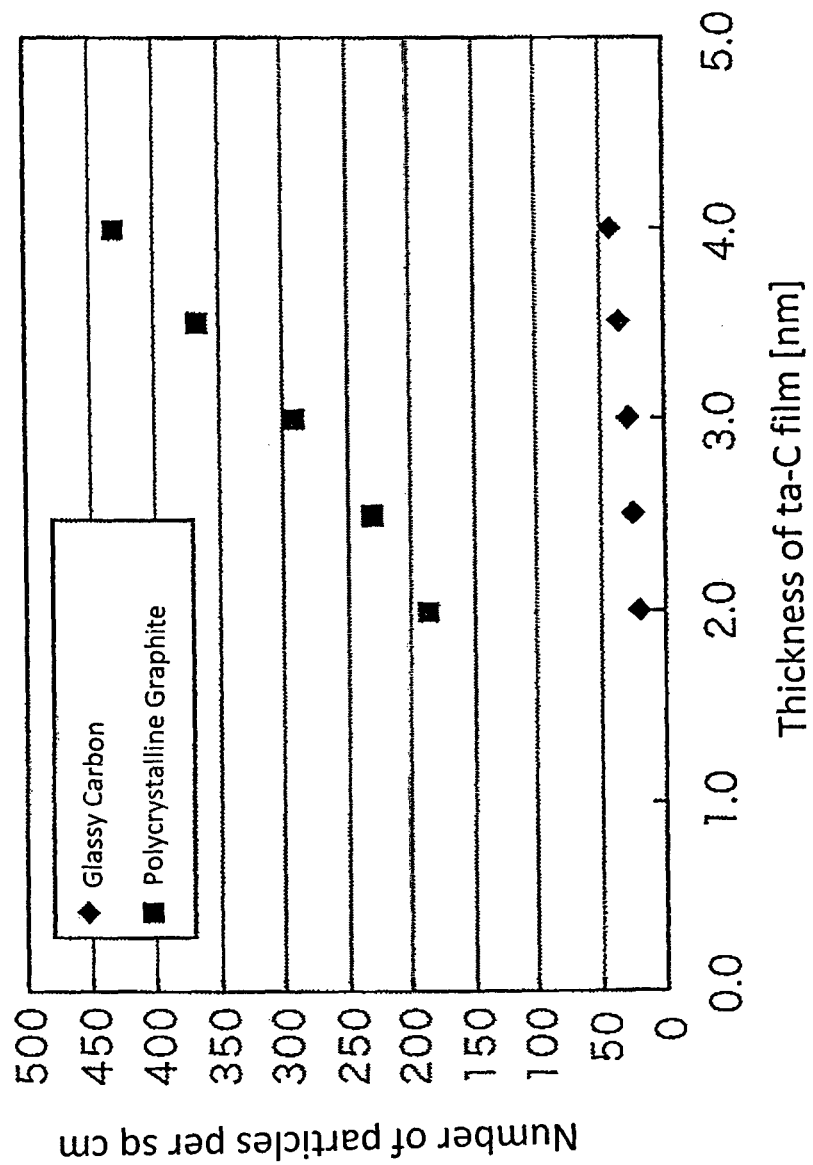
FIG. 2 is a graph showing a relationship between a thickness of protective films of embodiment examples and comparative examples and density of aggregate particles on the protective film.

The number of undesirable aggregate particles present on the protective film of the magnetic recording media obtained in Examples and Comparative Examples was measured using an optical surface inspection apparatus to obtain the density of the aggregate particles, the results of which are shown in FIG. 2.

The aggregate particle densities of the protective films with film thickness of 3.0, 2.5, and 2.0 nm obtained in Examples 1, 2, and 3 were 28, 24, and 19/cm$^2$, respectively, which were less than 30/cm$^2$ and satisfactory values. On the other hand, the aggregate particle densities of the protective films with film thicknesses of 3.5 and 4.0 nm obtained in Comparative Examples 1 and 2 were 35 and 41/cm$^2$ respectively, which did not provide the required aggregate particle density value of less than 30/cm$^2$. These results show that even in the use of a cathode target of glass state carbon which should be effective for suppressing aggregate particles, an increase in film thickness is accompanied by a gradual increase in the aggregate particle density.

The protective films of Comparative Example 3, which used a cathode target of polycrystalline graphite, resulted in a high aggregate particle density of 270/cm$^2$ for a film thickness of 3.0 nm, although the aggregate particle density tended to decrease with decrease in the film thickness. Therefore, it has been demonstrated that the use of glass state carbon for a cathode target remarkably reduces the aggregate particle density in an obtained ta-C film.

Thus, a protective film mainly composed of a tetrahedral amorphous carbon film and a magnetic recording medium having the protective film has been described according to the present invention. Many modifications and variations may be made to the techniques and structures described and illustrated herein without departing from the spirit and scope of the invention. Accordingly, it should be understood that the methods and structures described herein are illustrative only and are not limiting upon the scope of the invention.

This application is based on, and claims priority to, Japanese Patent Application No. 2008-136788, filed on May 26, 2008 contents of which are incorporated herein by reference. The disclosure of the priority application in its entirety, including the drawings, claims, and the specification thereof, is incorporated herein by reference.

DESCRIPTION OF SYMBOLS 10 arc source
11 anode
12 cathode target
13 striker electrode
20 filter part
21 core pipe
22 filter coil
23 raster coil
30 film deposition chamber
31 target substrate for film deposition
32 shutter

What is claimed is:

1. A method of manufacturing a protective film for a magnetic recording medium, the method comprising steps of:
   placing a target substrate for film deposition in a film deposition chamber;
   generating a plasma that contains carbon ions by arc discharge between an anode and a cathode target composed of glass state carbon, wherein the glass state carbon has a structure in which fine hexagonal mesh structures of graphite are randomly combined by sp3-like bonding;
   transporting only carbon ions through a filter to the film deposition chamber; and
   forming a tetrahedral amorphous carbon film by depositing the carbon ions on the target substrate
   wherein the protective film has a thickness not greater than 3.0 nm.

2. A method according to claim 1, wherein the protective film is mainly composed of a tetrahedral amorphous carbon film formed by a filtered cathodic arc method using a cathode target of glass state carbon.

3. A method according to claim 1, wherein the density of aggregate particles present on the protective film is less than 30 particles/cm$^2$.

4. A method according to claim 1, wherein the target substrate comprises at least a substrate with a magnetic recording layer thereon.

5. A method according to claim 1, wherein the glass state carbon is produced by carbonizing and graphitizing a thermosetting resin through a heat treatment under an inert gas atmosphere.

\* \* \* \* \*